US007751362B2

United States Patent
Katis et al.

(10) Patent No.: US 7,751,362 B2
(45) Date of Patent: *Jul. 6, 2010

(54) GRACEFUL DEGRADATION FOR VOICE COMMUNICATION SERVICES OVER WIRED AND WIRELESS NETWORKS

(75) Inventors: Thomas E. Katis, Jackson, WY (US); James T. Panttaja, Healdsburg, CA (US); Mary G. Panttaja, Healdsburg, CA (US); Matthew J. Ranney, Oakland, CA (US)

(73) Assignee: RebelVox LLC, San Francisco, CA (US)

( * ) Notice: Subject to any disclaimer, the term of this patent is extended or adjusted under 35 U.S.C. 154(b) by 81 days.

This patent is subject to a terminal disclaimer.

(21) Appl. No.: 12/212,595

(22) Filed: Sep. 17, 2008

(65) Prior Publication Data
US 2009/0103477 A1 Apr. 23, 2009

Related U.S. Application Data

(63) Continuation-in-part of application No. 12/028,400, filed on Feb. 8, 2008, and a continuation-in-part of application No. 12/192,890, filed on Aug. 15, 2008.

(60) Provisional application No. 61/089,417, filed on Aug. 15, 2008, provisional application No. 60/999,619, filed on Oct. 19, 2007.

(51) Int. Cl.
*H04W 4/00* (2009.01)
(52) U.S. Cl. .................................... 370/328
(58) Field of Classification Search ............. 370/338, 370/328, 352, 389, 466, 235, 230; 379/88, 379/93, 240; 704/229; 375/240, 141, 146, 375/147; 455/413, 417, 445, 423, 450; 348/423
See application file for complete search history.

(56) References Cited
U.S. PATENT DOCUMENTS 4,807,224 A  2/1989 Naron et al.

(Continued)

FOREIGN PATENT DOCUMENTS

EP  1715648  10/2006

(Continued)

OTHER PUBLICATIONS

"dircproxy," http://home.pcisys.net/~tbc/hacks/dircproxy.htm, Downloaded on Sep. 26, 2008, 1 page.

(Continued)

*Primary Examiner*—Pankaj Kumar
*Assistant Examiner*—Prenell P Jones
(74) *Attorney, Agent, or Firm*—Beyer Law Group LLP

(57) ABSTRACT

A communication device for gracefully extending the range and/or capacity of voice communication systems. The communication device includes a persistent storage device configured persistently store the voice media either generated when using the communication device or received over the network at the communication device. When the usable bit rate on the network is poor and below that necessary for conducting a live conversation, the communication device transmits voice media from persistent storage and stores received voice media in persistent storage at the available usable bit rate on the network. Although latency may be introduced during the back and forth transmissions of a conversation, the persistent storage of both transmitted and received media of a conversation provides the ability to extend the useful range of wireless networks beyond what is required for live conversations. In addition, the capacity and robustness in not being affected by external interferences for both wired and wireless communications is improved.

28 Claims, 7 Drawing Sheets

U.S. PATENT DOCUMENTS

| | | | |
|---|---|---|---|
| 5,117,422 A | 5/1992 | Hauptschein et al. | |
| 5,222,189 A * | 6/1993 | Fielder | 704/229 |
| 5,283,818 A | 2/1994 | Klausner et al. | |
| 5,375,018 A | 12/1994 | Klausner et al. | |
| 5,390,236 A | 2/1995 | Klausner et al. | |
| 5,487,167 A | 1/1996 | Dinallo et al. | |
| 5,524,140 A | 6/1996 | Klausner et al. | |
| 5,572,576 A | 11/1996 | Klausner et al. | |
| 5,617,145 A * | 4/1997 | Huang et al. | 348/423.1 |
| 5,692,213 A | 11/1997 | Goldberg et al. | |
| 5,734,963 A | 3/1998 | Fitzgerald et al. | |
| 5,737,011 A | 4/1998 | Lukacs | |
| 5,918,158 A | 6/1999 | LaPorta et al. | |
| 5,963,551 A | 10/1999 | Minko | |
| 5,970,122 A | 10/1999 | LaPorta et al. | |
| 6,037,932 A | 3/2000 | Feinleib | |
| 6,092,120 A | 7/2000 | Swaminathan et al. | |
| 6,104,757 A | 8/2000 | Rhee | |
| 6,175,619 B1 | 1/2001 | DeSimone | |
| 6,229,849 B1 * | 5/2001 | Mihara | 375/240.05 |
| 6,233,389 B1 | 5/2001 | Barton et al. | |
| 6,262,994 B1 | 7/2001 | Dirschedl et al. | |
| 6,378,035 B1 | 4/2002 | Parry et al. | |
| 6,480,783 B1 | 11/2002 | Myr | |
| 6,507,586 B1 | 1/2003 | Satran et al. | |
| 6,564,261 B1 | 5/2003 | Gudjonsson et al. | |
| 6,577,599 B1 | 6/2003 | Gupta et al. | |
| 6,580,694 B1 | 6/2003 | Baker | |
| 6,671,732 B1 | 12/2003 | Weiner | |
| 6,717,925 B1 | 4/2004 | Leppisaari et al. | |
| 6,721,703 B2 | 4/2004 | Jackson et al. | |
| 6,791,949 B1 | 9/2004 | Ryu et al. | |
| 6,807,565 B1 | 10/2004 | Dodrill et al. | |
| 6,807,578 B2 | 10/2004 | Satran et al. | |
| 6,829,473 B2 | 12/2004 | Raman et al. | |
| 6,834,039 B1 | 12/2004 | Kelly et al. | |
| 6,850,965 B2 | 2/2005 | Allen | |
| 6,912,544 B1 | 6/2005 | Weiner | |
| 6,931,114 B1 | 8/2005 | Martin | |
| 6,970,926 B1 | 11/2005 | Needham et al. | |
| 6,973,309 B1 | 12/2005 | Rygula et al. | |
| 6,993,009 B2 | 1/2006 | Kelly et al. | |
| 6,996,624 B1 | 2/2006 | LeCroy et al. | |
| 7,002,913 B2 | 2/2006 | Huang et al. | |
| 7,039,040 B1 | 5/2006 | Burg | |
| 7,039,675 B1 | 5/2006 | Kato | |
| 7,047,030 B2 | 5/2006 | Forsyth | |
| 7,111,044 B2 | 9/2006 | Lee | |
| 7,117,521 B2 | 10/2006 | Puthiyedath | |
| 7,139,371 B2 | 11/2006 | McElvaney | |
| 7,171,491 B1 | 1/2007 | O'Toole et al. | |
| 7,187,941 B2 | 3/2007 | Siegel | |
| 7,218,709 B2 | 5/2007 | Garg et al. | |
| 7,233,589 B2 | 6/2007 | Tanigawa et al. | |
| 7,236,738 B2 | 6/2007 | Settle | |
| 7,240,105 B2 | 7/2007 | Satran et al. | |
| 7,304,951 B2 | 12/2007 | Rhee | |
| 7,305,438 B2 | 12/2007 | Christensen et al. | |
| 7,313,593 B1 | 12/2007 | Pulito et al. | |
| 7,349,871 B2 | 3/2008 | Labrou et al. | |
| 7,382,881 B2 | 6/2008 | Uusitalo et al. | |
| 7,403,775 B2 | 7/2008 | Patel et al. | |
| 7,626,951 B2 | 12/2009 | Croy et al. | |
| 2001/0025377 A1 | 9/2001 | Hinderks | |
| 2002/0128029 A1 | 9/2002 | Nishikawa et al. | |
| 2002/0150094 A1 | 10/2002 | Cheng et al. | |
| 2002/0154745 A1 | 10/2002 | Shtivelman | |
| 2002/0159600 A1 | 10/2002 | Weiner | |
| 2002/0184368 A1 | 12/2002 | Wang | |
| 2003/0027566 A1 | 2/2003 | Weiner | |
| 2003/0028632 A1 | 2/2003 | Davis | |
| 2003/0099198 A1 | 5/2003 | Kiremidjian et al. | |
| 2003/0126162 A1 | 7/2003 | Yohe et al. | |
| 2003/0186722 A1 | 10/2003 | Weiner | |
| 2004/0017905 A1 | 1/2004 | Warrier et al. | |
| 2004/0019539 A1 | 1/2004 | Raman et al. | |
| 2004/0044783 A1 | 3/2004 | Nordberg | |
| 2004/0074448 A1 | 4/2004 | Bunt | |
| 2004/0090959 A1 | 5/2004 | Cinghita et al. | |
| 2004/0095900 A1 | 5/2004 | Siegel | |
| 2004/0117722 A1 | 6/2004 | Harada | |
| 2004/0192353 A1 | 9/2004 | Mason et al. | |
| 2004/0192378 A1 | 9/2004 | Wulkan | |
| 2004/0252679 A1 | 12/2004 | Williams et al. | |
| 2004/0255148 A1 | 12/2004 | Monteiro et al. | |
| 2004/0258220 A1 | 12/2004 | Levine et al. | |
| 2005/0021819 A1 | 1/2005 | Kilkki | |
| 2005/0025308 A1 | 2/2005 | Tischer et al. | |
| 2005/0030932 A1 | 2/2005 | Kelly et al. | |
| 2005/0037706 A1 | 2/2005 | Settle | |
| 2005/0053033 A1 | 3/2005 | Kelly et al. | |
| 2005/0102358 A1 | 5/2005 | Gold et al. | |
| 2005/0135333 A1 | 6/2005 | Rojas | |
| 2005/0144247 A1 | 6/2005 | Christensen et al. | |
| 2005/0160345 A1 | 7/2005 | Walsh et al. | |
| 2005/0202807 A1 | 9/2005 | Ayyasamy | |
| 2005/0207487 A1 | 9/2005 | Monroe | |
| 2005/0215228 A1 | 9/2005 | Fostick et al. | |
| 2005/0220137 A1 | 10/2005 | Prigent et al. | |
| 2005/0259682 A1 | 11/2005 | Yosef et al. | |
| 2005/0288101 A1 | 12/2005 | Lockton et al. | |
| 2006/0007943 A1 | 1/2006 | Fellman | |
| 2006/0045038 A1 | 3/2006 | Kay et al. | |
| 2006/0059267 A1 | 3/2006 | Cugi et al. | |
| 2006/0059342 A1 | 3/2006 | Medvinsky et al. | |
| 2006/0093304 A1 | 5/2006 | Battey et al. | |
| 2006/0107285 A1 | 5/2006 | Medvinsky | |
| 2006/0146822 A1 | 7/2006 | Kolakowski et al. | |
| 2006/0187897 A1 | 8/2006 | Dabbs et al. | |
| 2006/0189305 A1 | 8/2006 | Ando et al. | |
| 2006/0212582 A1 | 9/2006 | Gupta et al. | |
| 2006/0212592 A1 | 9/2006 | Gupta et al. | |
| 2006/0224748 A1 | 10/2006 | Gupta et al. | |
| 2006/0244588 A1 | 11/2006 | Hannah et al. | |
| 2006/0245367 A1 | 11/2006 | Jeffery et al. | |
| 2006/0253599 A1 | 11/2006 | Monteiro et al. | |
| 2006/0268750 A1 | 11/2006 | Weiner | |
| 2006/0274698 A1 | 12/2006 | Twitchell | |
| 2006/0276714 A1 | 12/2006 | Holt et al. | |
| 2006/0282544 A1 | 12/2006 | Monteiro et al. | |
| 2006/0288391 A1 | 12/2006 | Puthiyedath | |
| 2006/0294259 A1 | 12/2006 | Matefi et al. | |
| 2007/0001869 A1 | 1/2007 | Hunzinger | |
| 2007/0159321 A1 | 7/2007 | Ogata et al. | |
| 2007/0173239 A1 * | 7/2007 | Scott et al. | 455/417 |
| 2007/0180032 A1 | 8/2007 | Pearson | |
| 2007/0182819 A1 | 8/2007 | Monroe | |
| 2007/0207785 A1 | 9/2007 | Chatterjee et al. | |
| 2007/0230566 A1 * | 10/2007 | Eleftheriadis et al. | 375/240.1 |
| 2008/0000979 A1 | 1/2008 | Poisner | |
| 2008/0002621 A1 | 1/2008 | Ginzburg et al. | |
| 2008/0002691 A1 | 1/2008 | Qi et al. | |
| 2008/0086700 A1 | 4/2008 | Rodriguez et al. | |
| 2008/0134054 A1 | 6/2008 | Clark et al. | |
| 2009/0003558 A1 * | 1/2009 | Katis et al. | 379/93.01 |
| 2009/0063698 A1 | 3/2009 | Xu et al. | |
| 2009/0103476 A1 | 4/2009 | Katis et al. | |
| 2009/0103521 A1 * | 4/2009 | Katis et al. | 370/352 |
| 2009/0175425 A1 | 7/2009 | Lee | |

FOREIGN PATENT DOCUMENTS

| | | |
|---|---|---|
| EP | 1725060 A1 | 11/2006 |
| WO | WO 03/073642 | 9/2003 |

| | | |
|---|---|---|
| WO | WO 2006/096557 | 9/2006 |
| WO | WO 2006/114673 | 11/2006 |
| WO | WO 2007/026320 | 3/2007 |

OTHER PUBLICATIONS

Apple Inc., "iPhone User's Guide," http://manuals.info.apple.com/en_US/iPhone_User_Guide.pdf, Downloaded on Oct. 3, 2008, 154 pages.

Brandx.net, "Using Talk," http://www.brandx.net/support/usingtelnet/talk.shtml, Downloaded on Sep. 19, 2008, 2 pages.

Businesswire.com "LignUp 4.0 Delivers Industry's Most Comprehensive Suite of Communications Web Services," http://www.businesswire.com/portal/site/google/index.jsp?ndmViewId=news_view&newsId=20070430005498&newsLang=en, Downloaded on Nov. 21, 2008, 10 pages.

Calore, Michael, "SpinVox Moves Into VoIP, Brings Voice-to-Text to Skype Users," Monkey_Bites, http://blog.wired.com/monkeybites/2007/08/spinvox-moves-i.html, Downloaded on Oct. 3, 2008, 4 pages.

Cardei et al., "MAC Layer QoS Support for Wireless Networks of Unmanned Air Vehicles," Proceedings of the 37th Hawaii International Conference on System Sciences—2004, Jan. 5-8, 2004 pp. 9 pp.

Chen et al., "An Adaptive Multimedia Transmission Protocol for Distributed Multimedia Applications," Proceedings of the 5th International Workshop on Multimedia Network Systems and Applications (MNSA'2003), in conjunction with The 23rd International Conference on Distributed Computing Systems (ICDCS-2003), 6 pages.

Dannen, Chris, "Technology: The Skype Mobile Phone Will Blow Your Mind," Dec. 18, 2007, URL: http://www.fastcompany.com/blog/chris-dannen/lab/technology-skype-mobile-phone-will-blow-your-mind, 2 pages.

Erwu et al., "Packet-late indication based (PLIB): adaptive jitter buffer," ACM International Conference Proceeding Series; vol. 58, Proceedings of the winter international symposium on Information and conununication technologies, Cancun, Mexico, Session: Performance, reliability, and quality of service, pp. 1-5 Year of Publication: 2004.

FAQS.org, "RFC1644—T/TCP—TCP Extensions for Transactions Functional S," http://www.faqs.org/rfcs/rfc1644.html, Downloaded on Sep. 19, 2008, 26 pages.

FluidVoice "Overview of FluidVoice," http://viral.media.mit.edu/wiki/tiki-index.php?page=FluidVoice, Downloaded on Sep. 16, 2008, 2 pages.

GrandCentral.com, "Call Record," http://www.grandcentral.com/howitworks/call_record, Downloaded on Sep. 26, 2008, 1 page.

GrandCentral.com, "One Voicemail Box," http://www.grandcentral.com/home/one_voicemail, Downloaded on Sep. 26, 2008, 1 page.

GrandCentral.com, "So Many Features, You Won't Believe it," http://www.grandcentral.com/support/howitworks/, Downloaded on Sep. 26, 2008, 1 page.

GrandCentral.com, "Voicemail forwarding," http://www.grandcentral.com/howitworks/voicemail_forwarding, Downloaded on Sep. 26, 2008, 1 page.

Henshall, Stuart, "HotRecorder—Record Skype Calls," Skype Journal, URL: http://skypejournal.com/blog/archives/2005/03/hotrecorder_rec.php, Mar. 25, 2005, 11 pages.

IRCHelp.org, "An IRC Tutorial," http://www.irchelp.org/irchelp/irctutorial.html, Downloaded on Sep. 26, 2008, 14 pages.

Kadoink.com, "Get a Widget," http://www.kadoink.com/index.cfm?action=getWidgets, Downloaded on Sep. 19, 2008, 3 pages.

Krishnan et al., "EVRC-Wideband: The New 3GPP2 Wideband Vocoder Standard," IEEE International Conference on Acoustics, Speech and Signal Processing, 2007. ICASSP 2007, Publication Date: Apr. 15-20, 2007, vol. 2, on pp. II-333-II-336, Honolulu, HI.

Layton, Julia, "How Slingbox Works," Jan. 4, 2006, HowStuffWorks.com, http://electronics.howstuffworks.com/slingbox.htm, 9 pages.

LignUp.com, "LignUp Communications Applications Server," http://www.lignup.com/platform/index.html, Downloaded on Sep. 19, 2008, 1 page.

Network Dictionary, "Instant Message (IM) Technology Overview," http://www.networkdictionary.com/networking/im.php, Downloaded on Sep. 16, 2008, 2 pages.

Nikotalkie.com, "Nikotalkie—Home," http://www.nikotalkie.com/, Downloaded on Sep. 19, 2008, 2 pages.

Nikotel.com, "Click-Pop-Talk WebStart Phone," http://www.nikotel.com/nikotel-click-pop-talk-java-phone.html, Downloaded on Sep. 19, 2008, 1 page.

Notaras, George, "dircproxy IRC Proxy," http://www.g-loaded.eu/2007/02/01/dircproxy-irc-proxy/, Downloaded on Sep. 26, 2008, 4 pages.

Pash, Adam, "Consolidate Your Phones with GrandCentral," http://techgroup.groups.vox.com/library/post/6a00cd978d0ef7f9cc00e398b8ff7a0002.html, Downloaded on Sep. 19, 2008, 5 pages.

Patel, Nilay, "Apple patent reveals data-to-voice translation system for cellphones," Jul. 28, 2007, URL: http://www.engadget.com/2007/07/28/apple-patent-reveals-data-to-voice-translation-system-for-cellph/, 5 pages.

Piecuch et al., "A Selective Retransmission Protocol for Multimedia on the Internet," In Proceedings of SPIE Multimedia Systems and Applications, Nov. 2000, Boston MA, USA, 12 pages.

Qiao et al., "SCTP Performance Issue on Path Delay Differential," Lecture Notes in Computer Science, Springer Berlin / Heidelberg ISSN 0302-9743 (Print) 1611-3349 (Online) vol. 4517/2007, Wired/Wireless Internet Communications, pp. 43-54 Sunday, Jun. 24, 2007.

Ramo et al., "On comparing speech quality of various narrow- and wideband speech codecs," Proceedings of the Eighth International Symposium on Signal Processing and Its Applications, 2005. Publication Date: Aug. 28-31, 2005, vol. 2, on pp. 603-606.

Rey et al., "I-D ACTION:draft-ietf-avt-rtp-retransmission-09.txt," Aug. 5, 2003, http://osdir.com/ml/ietf.avt/2003-08/msg00003.html, Downloaded on Sep. 19, 2008, 2 pages.

Ribbit.com, "Amphibian," http://www.ribbit.com/everyday/, Downloaded on Sep. 26, 2008, 1 page.

Ribbit.com, "Enhanced Visual Voicemail," http://www.ribbit.com/everyday/tour/enhanced_visual_voicemail.php, Downloaded on Sep. 26, 2008, 2 pages.

Ribbit.com, "What is Ribbit? Features," http://www.ribbit.com/platform/features.php, Downloaded on Sep. 26, 2008, 1 page.

Ribbit.com, "What is Ribbit? Overview," http://www.ribbit.com/platform/index.php, Downloaded on Sep. 26, 2008, 1 page.

Ribbit.com, "What is Ribbit? Voice Architecture," http://www.ribbit.com/platform/architecture.php, Downloaded on Sep. 26, 2008, 2 pages.

Saito et al., "IP Packet Loss Compensation Scheme with Bicast and Forwarding for Handover in Mobile Communications," 2006 IEEE 17th International Symposium on Personal, Indoor and Mobile Radio Communications, Sep. 2006, pp. 1-5, Helsinki.

Skype.com, "Making calls is just the start," URL: http://www.skype.com/features/, Downloaded on Sep. 16, 2008, 2 pages.

Spinvox.com, "Home Page," http://www.spinvox.com/, Downloaded on Sep. 26, 2008, 3 pages.

Spinvox.com, "How Does it Work?," http://www.spinvox.com/how_it_works.html, Downloaded on Sep. 19, 2008, 2 pages.

Swissvoice.net, "PSTN," http://www.swissvoice.net/ww/htm_ww/08_technology/content_pstn.html, Downloaded on Sep. 19, 2008, 3 pages.

Tektronix, "VOIP Technology Overview; Protocols, Convergence, Testing," http://www.tektronics.com/voip, May 12, 2006.

The Jabber Extensible Communications Platform™, "Products // Jabber XCP," URL: http://www.jabber.com/CE/JabberXCP, Downloaded on Sep. 16, 2008, 2 pages.

ThunkDifferent.com, "YouMail vs. Google Grandcentral Voice Mail Service," http://thunkdifferent.com/2007/10/11/youmail-vs-google-grandcentral-voice-mail-service/, Downloaded on Oct. 3, 2008, 6 pages.

VOIP-News.com, "Company Profile, LignUp," http://www.voip-news.com/vendors/lignup/, Downloaded on Dec. 5, 2008, 6 pages.

WikiBooks, "Internet Technologies/IRC," http://en.wikibooks.org/wiki/Internet_Technologies/IRC, Downloaded on Sep. 19, 2008, 4 pages.

WikiPedia—The Free Encyclopedia, "*E-mail*," http://en.wikipedia.org/wiki/E-mail, Downloaded on Sep. 19, 2008, 8 pages.

WikiPedia—The Free Encyclopedia, "*Internet Relay Chat*," http://en.wikipedia.org/wiki/Internet_Relay_Chat, Downloaded on Oct. 3, 2008, 11 pages.

WikiPedia—The Free Encyclopedia, "*Spinvox*," http://en.wikipedia.org/wiki/Spinvox, Downloaded on Sep. 26, 2008, 1 page.

WikiPedia—The Free Encyclopedia, "*TiVo*", http://en.wikipedia.org/wiki/TiVo, Downloaded on Sep. 16, 2008, 6 pages.

Yavuz et al., "*VoIP over cdma2000 1xEV-DO Revision A*," IEEE Communications Magazine, Feb. 2006, pp. 88-95.

HotRecorder.com, "*Features*," http://www.hotrecorder.com/music_features.asp, downloaded on Sep. 26, 2008, 1 page.

HotRecorder.com, "*Help*," http://www.hotrecorder.com/music_help.asp, downloaded on Sep. 26, 2008, 3 pages.

HotRecorder.com, "*FAQs*," http://www.hotrecorder.com/music_support.asp, downloaded on Sep. 26, 2008, 1 page.

WikiPedia—The Free Encyclopedia, "*Skype*," http://en.wikipedia.org/wiki/Skype, Downloaded on Sep. 26, 2008, 7 pages.

WikiPedia—The Free Encyclopedia, "*Skype Protocol*," http://en.wikipedia.org/wiki/Skype, Downloaded on Sep. 26, 2008, 4 pages.

Jabber.org, "*Main page*," http://www.jabber.org/web/main_page, Sep. 2, 2008, downloaded on Sep. 26, 2008, 1 page.

Jabber.org, "*FAQ*," http://www.jabber.org/web/faq, Sep. 4, 2008, downloaded on Sep. 26, 2008, 2 pages.

Apple Inc., "*iPhone: About Visual Voicemail*," http://www.support.apple.com/kb/HT 1486, Downloaded on Sep. 26, 2008, 3 pages.

Jabber.org, "*Products // Jabber XCP // Benefits*," http://www.jabber.com/CE/JabberXCPBenefits, downloaded on Sep. 26, 2008, 1 page.

Jabber.org, "*Products //Jabber Clients*," http://www.jabber.com/CE/JabberClients, downloaded on Sep. 26, 2008, 1 page.

Jabber.org, "*Products // JabberNow*" http://www.jabber.com/CE/JabberNow, downloaded on Sep. 26, 2008, 1 page.

KillerStartups.com, "*Kadoink.com—Mobilizing your Socializing*," http://www.killerstartups.com/Web20/kadoink-com-moblizing-your-socializing, Downloaded on Sep. 26, 2008, 3 pages.

CNETNews.com, "*Kadoink's phonecast lines officially open for texting*," http://news.cnet.com/8301-17939_109-9829877-2.html, downloaded on Sep. 26, 2008, 1 page.

BusinessWire.com, "*LignUp 4.0 Delivers Industry's Most Comprehensive Suite of Communications Web Services*," Apr. 30, 2007, http://www.businesswire.com/portal/site/google/?ndmViewId=news_view&newsId=20070430005498&newsLang=en, Downloaded on Sep. 26, 2008, 6 pages.

VOIP-News.com, "*Company Profile—LignUp*," http://www.voip-news.com/vendors/lignup/, Downloaded on Oct. 3, 2008, 6 pages.

JustAnotheriPhoneBlog.com, "*Nikotalkie—Just Talk, Don't Type*," http://justanotheriphoneblog.com/wordpress/2007/10/13/nikotalkie-just-talk-dont-type/, Downloaded on Sep. 26, 2008, 10 pages.

WikiPedia—The Free Encyclopedia, "*Push to Talk*" http://en.wikipedia.org/wiki/Push_to_talk, Downloaded on Sep. 26, 2008, 3 pages.

WikiPedia—The Free Encyclopedia, "*Slingbox*" http://en.wikipedia.org/wiki/Slingbox, Downloaded on Sep. 26, 2008, 4 pages.

About.com, "*Linux / Unix Command: talk*,"http://linux.about.com/od/commands/1/b1cmdl1_talk.htm, Downloaded on Sep. 26, 2008, 2 pages.

Fall, Kevin, "*A Delay-Tolerant Network Architecture for Challenged Internets*," Feb. 2003, http://www.dtnrg.org/docs/papers/IRB-TR-03-003.pdf, 15 pages.

Chuah et al., "*Store-and-Forward Performance in a DTN*," Vehicular Technology Conference, 2006. VTC 2006-Spring. IEEE 63$^{rd}$, Publication Date: May 7-10, 2006, vol. 1, on pp. 187-191.

Krishnan, et al., "*The SPINDLE Disruption-Tolerant Networking System*," Military Communications Conference, 2007. MILCOM 2007. IEEE Volume , Issue , Oct. 29-31, 2007 pp. 1-7.

WikiPedia—The Free Encyclopedia, "*Visual Voicemail*" http://en.wikipedia.org/wiki/Visual_voicemail, downloaded on Sep. 26, 2008, 1 page.

Amir et al., "*An Overlay Architecture for High Quality VoIP Streams,*", IEEE Transactions on Multimedia, Publication Date: Dec. 2006, vol. 8, Issue:6, On pp. 1250-1262.

Rothermel et al., "*An Adaptive Stream Synchronization Protocol*," Lecture Notes in Computer Science; vol. 1018, Proceedings of the 5th International Workshop on Network and Operating System Support for Digital Audio and Video, pp. 178-189, Year of Publication: 1995.

Baset et al., "*An Analysis of the Skype Peer-to-Peer Internet Telephony Protocol*," INFOCOM 2006. 25th IEEE International Conference on Computer Communications. Proceedings (2006), pp. 1-11.

Cerf et al., "*A Protocol for Packet Network Intercommunication*," Communications, IEEE Transactions on, vol. 22, Issue 5, May 1974 pp. 637-648.

International Search Report in PCT application PCT/US2008/079227 mailed Feb. 5, 2009.

Written Opinion in PCT application PCT/US2008/079227 mailed Feb. 5, 2009.

Office Action dated Sep. 8, 2009 in European Patent Application No. 08839365.7.

WikiPedia—The Free Encyclopedia, "*Eudora (email client)*," http://en.wikipedia.org/wiki/Eudora_(e-mail_client), Downloaded on Aug. 20, 2009, 3 pages.

"*Eudora*," Answers.com, http://www.answers.com/topic/eudora-e-mail-client, Downloaded on Aug. 20, 2009, 4 pages.

"*The Eudora Open Messaging Advantage*," Qualcomm, 1997, Part No. 100-50030-1, 23 pages.

"*Aspera—Next Generation File Transport—Broadcasting & Entertainment Media*," Asperasoft.com, http://www.asperasoft.com/en/industries/digital_media_10/Broadcast_Entertainment_Media_5, Downloaded on Sep. 22, 2009, 2 pages.

"*Aspera—Next Generation File Transport—fasp™ transfer times,*" Asperasoft.com, http://www.asperasoft.com/en/technology/fasp_transfer_times_14/fasp_transfer_times_14, Downloaded on Sep. 22, 2009, 1 page.

"*Aspera—Next Generation File Transport—the fasp solution*," Asperasoft.com, http://www.asperasoft.com/en/technology/fasp_solution_3/the_fasp_solution_3, Downloaded on Sep. 22, 2009, 3 pages.

"*Aspera—Next Generation File Transport—the shortcomings of TCP file transfer*," Asperasoft.com, http://www.asperasoft.com/en/technology/shortcomings_of_TCP_2/the_shortcomings_of_TCP_file_transfer_2, Downloaded on Sep. 22, 2009, 2 pages.

"*Aspera—Next Generation File Transport—fasp technology overview*" Asperasoft.com, http://www.asperasoft.com/en/technology/fasp_overview_1/fasp_technology_overview_1, Downloaded on Sep. 22, 2009, 2 pages.

"*Aspera fasp™ High Speed Transport- A Critical Technology Comparison*," White Paper, Asperasoft.com, http://www.asperasoft.com/en/technology/white_papers_13/aspera_fasp_high_speed_transport_13, Downloaded on Sep. 22, 2009, 11 pages.

"*Palringo Brings First Push-to-Talk Application to the iPhone*," RedOrbit.com, http://www.redorbit.com/news/technology/1525545/palringo_brings_first_pushtotalk_application_to_the_iphone/index.html, Downloaded on Aug. 13, 2009, 2 pages.

*Palringo—Features*, Palringo.com, http://www.palringo.com/en/gb/features/, Downloaded on Aug. 13, 2009, 1 page.

Moren, Dan, "*Palringo Brings Picture Messaging to Iphone*," http://www.pcworld.com/article/149108/palringo_brings_picture_messaging_to_iphone. html, Downloaded on Aug. 13, 2009, 3 pages.

Paul, Ryan, "*Gmail gets Google Talk integration*,"Arstechnica.com, http://arstechnica.com/old/content/2006/02/6128.ars , Downloaded on Aug. 20, 2009, 1 page.

Sherman, Chris, "*Google Integrates Chat with Gmail,*"Search Engine Watch, http://searchenginewatch.com/3583121, Feb. 7, 2006, Downloaded on Aug. 20, 2009, 2 pages.

"*About Gmail*," http://mail.google.com/mail/help/chat.html, Downloaded on Aug. 20, 2009, 3 pages.

WikiPedia—The Free Encyclopedia, "*Google Talk*," http://en.wikipedia.org/wiki/Google_Talk, Downloaded on Aug. 20, 2009, 8 pages.

Azuri, Calvin, "*Palringo Gold Launched on BlackBerry Smartphone*", Apr. 20, 2009, http://ivr.tmcnet.com/topics/ivr-voicexml/articles/54573-palringo-gold-launched-blackberry-smartphone.htm, Downloaded on Aug. 13, 2009, 3 pages.

Liaw, Kim Poh, "*Palringo launches its IM Software for Android Phones*," Slashphone.com, Mar. 24, 2009, http://www.slashphone.com/palringo-launches-its-im-software-for-android-phones-245111, Downloaded on Aug. 13, 2009, 8 pages.

WikiPedia—The Free Encyclopedia, "*Palringo*" http://en.wikipedia.org/wiki/Palringo, Downloaded on Aug. 13, 2009, 1 page.

U.S. Appl. No. 12/552,994, filed Sep. 2, 2009.

International Search Report in PCT application PCT/US2009/055925 mailed Dec. 7, 2009.

Written Opinion in PCT application PCT/US2009/055925 mailed Dec. 7, 2009.

Office Action dated Mar. 3, 2010 in European Patent Application No. 08839365.7.

* cited by examiner

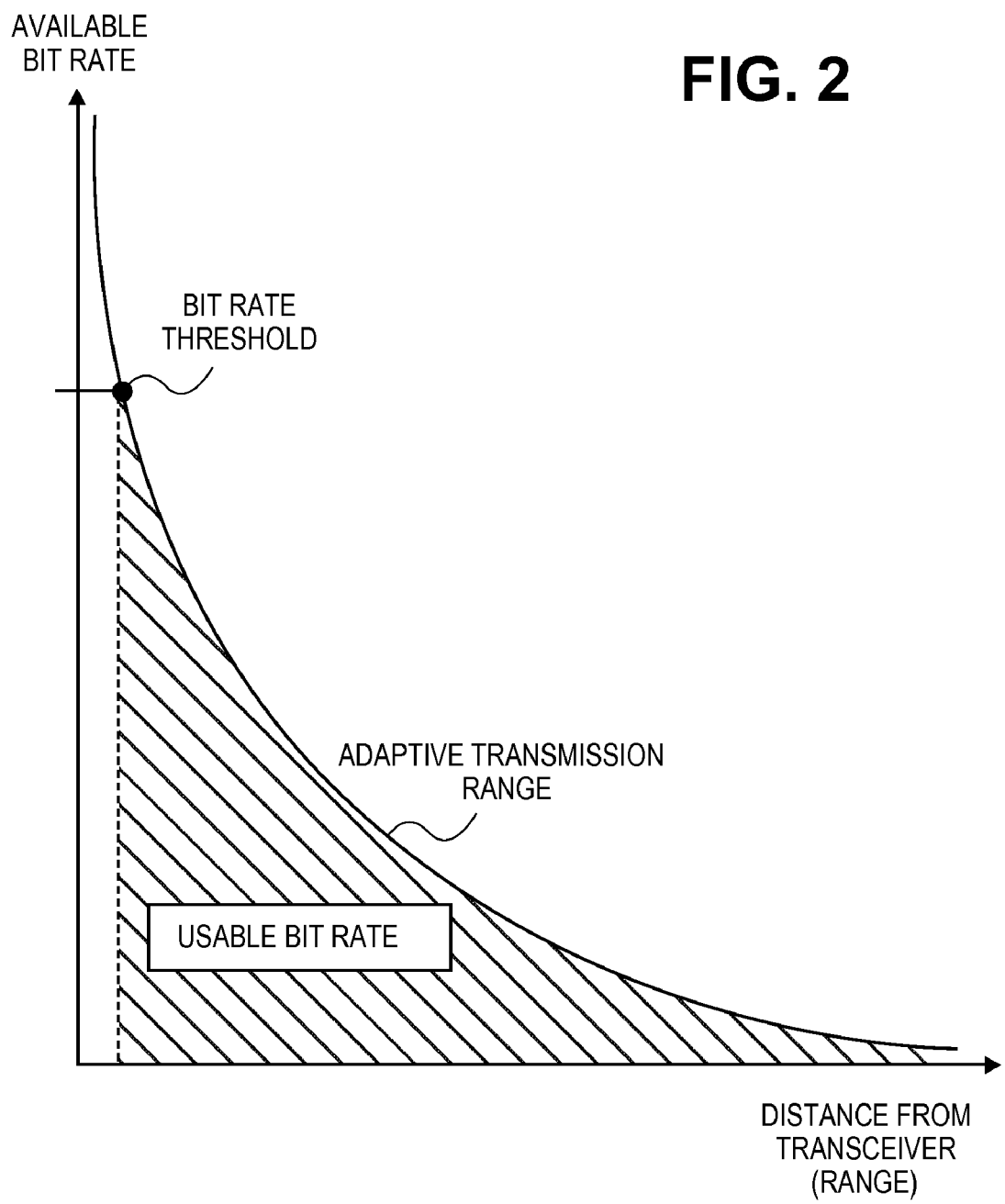

GRACEFUL DEGRADATION FOR VOICE COMMUNICATION SERVICES OVER WIRED AND WIRELESS NETWORKS

CROSS-REFERENCE TO RELATED APPLICATIONS

This application claims the benefit of priority to U.S. Provisional Patent Application No. 61/089,417 filed Aug. 15, 2008, entitled "Graceful Degradation for Wireless Voice Communication Services," and U.S. Provisional Patent Application No. 60/999,619, filed on Oct. 19, 2007, entitled "Telecommunication and Multimedia Management System and Method." This application is a continuation-in-part of U.S. patent application Ser. No. 12/028,400, filed Feb. 8, 2008, entitled "Telecommunication and Multimedia Management Method and Apparatus." This application is also a continuation in part of U.S. patent application Ser. No. 12/192,890, filed Aug. 15, 2008, entitled "Telecommunication and Multimedia Management Method and Apparatus." All of the foregoing applications are incorporated herein by reference in their entirety for all purposes.

BACKGROUND

1. Field of the Invention

This invention relates to voice communication, and more particularly, to the graceful degradation of voice communication services when network conditions prevent live or real-time communication.

2. Description of Related Art

Current wireless voice communications, such as mobile phones or radios, support only live communications. For communication to take place with existing wireless communication systems, a wireless network connection with a sufficient usable bit rate to support a live conversation must exist between the two wireless devices in communication with each other. If such a connection does not exist, then no communication can take place.

When a person is engaged in a conversation using their mobile phone, for example, a network connection between the phone and the local radio transceiver (i.e., a cell tower) of sufficient usable bit rate to support a live conversation must exist before any communication can take place. As long as the mobile phone is within the range of the radio transceiver, the signal strength or usable bit rate is typically more than adequate for conducting phone conversations.

As the person using the mobile phone travels away from the radio transceiver, or they enter an area of poor coverage, such as in a tunnel or canyon, the usable bit rate or signal strength on the wireless network connection is typically reduced. If the distance becomes so great, or the reception so poor, the usable bit rate may be reduced beyond the range where communication may take place. Beyond this range, the user may no longer be able to continue an ongoing call or make a new call. Similarly, when too many users are conducting calls on the network at the same time, the total aggregate usable bit rate for all the calls may exceed the usable bit rate capacity of the radio transceiver. In such situations, certain calls may be dropped in an effort to preserve the usable bit rate or capacity for other calls. As the number of calls on the network decreases, or usable bit rate conditions on the wireless network improve, dropped users may again rejoin the network and make new calls as capacity on the network improves. In yet another example, in situations where there is severe radio interference, such as electrical or electromagnetic disturbances, intentional jamming of the wireless network, the antenna on a communication device or the radio transmitter is broken or not working properly, or the communication device and/or the radio transceiver have been improperly configured, the usable bit rate on the network connection may be insufficient for users to make calls or conduct live voice communications.

With current wireless voice communication systems, there is no persistent storage of the voice media of conversations. When a person engages in a conversation using either mobile phones or radios, there is no storage of the voice media of the conversations other than possibly what is necessary for transmission and rendering. Without persistent storage, the voice media of a conversation is irretrievably lost after transmission and rendering. There is no way to retrieve that voice media subsequent transmission or review. Consequently, wireless voice communication systems are reliant on network connections. If at any point the usable bit rate on the network is insufficient for a live conversation, regardless of the reason, there can be no communication. Mobile phones and radios are essentially unusable until the usable bit rate on the network improves to the point where live communications can commence again.

Wired communication networks may also have capacity problems when too many users are attempting to use the network at the same time or there are external interferences degrading the performance of the network. In these situations, calls are typically dropped and/or no new calls can be made in order to preserve usable bandwidth for other users. With wired voice communication systems, there is also typically no persistent storage of the voice media of a conversation. As a result, there is no way to transmit voice media from persistent storage at times when the usable bit rate on the wired network connection falls below what is necessary for maintaining a live conversation.

With most voice mail systems used with mobile or landline phones, a network with sufficient usable bit rate to support a live conversation is needed before the voicemail system can be used. When a person is leaving a voice mail, a live connection is needed before a message can be left. Alternatively, the recipient must have a live connection before the message can be accessed and reviewed. With certain types of more advanced email systems, such as Visual voice mail, a recipient may download a received message and store it on their mobile phone for later review. With Visual voice mail, however, one can review a previously downloaded message when disconnected from the network or network conditions are poor. However, there is no way to generate and transmit messages when network conditions are inadequate to support a live connection. A network connection with a usable bit rate sufficient for maintaining a live conversation is still needed before a message can be generated and transmitted to another person.

A method and communication device for the graceful degradation of wireless and wired voice networks, which extend the range and/or capacity of these networks, is therefore needed.

SUMMARY OF THE INVENTION

A communication device for gracefully extending the range and/or capacity of voice communication systems is disclosed. The communication device includes a persistent storage device configured persistently store the voice media either generated when using the communication device or received over the network at the communication device. When the usable bit rate on the network is poor and below that necessary for conducting a live conversation, the communication device transmits voice media from persistent storage and stores received voice media in persistent storage at the available usable bit rate on the network. Although latency may be introduced during the back and forth transmissions of a conversation, the persistent storage of both transmitted and received media of a conversation provides the ability to extend the useful range of wireless networks beyond what is required for live conversations. In addition, the capacity and robustness in not being affected by external interferences for both wired and wireless communications is improved.

BRIEF DESCRIPTION OF THE DRAWINGS

The invention may best be understood by reference to the following description taken in conjunction with the accompanying drawings, which illustrate specific embodiments of the invention.

FIG. 2 is a plot illustrating the graceful degradation of wireless network services versus range in according to the present invention.

It should be noted that like reference numbers refer to like elements in the figures.

DETAILED DESCRIPTION OF SPECIFIC EMBODIMENTS

Figure 1A:
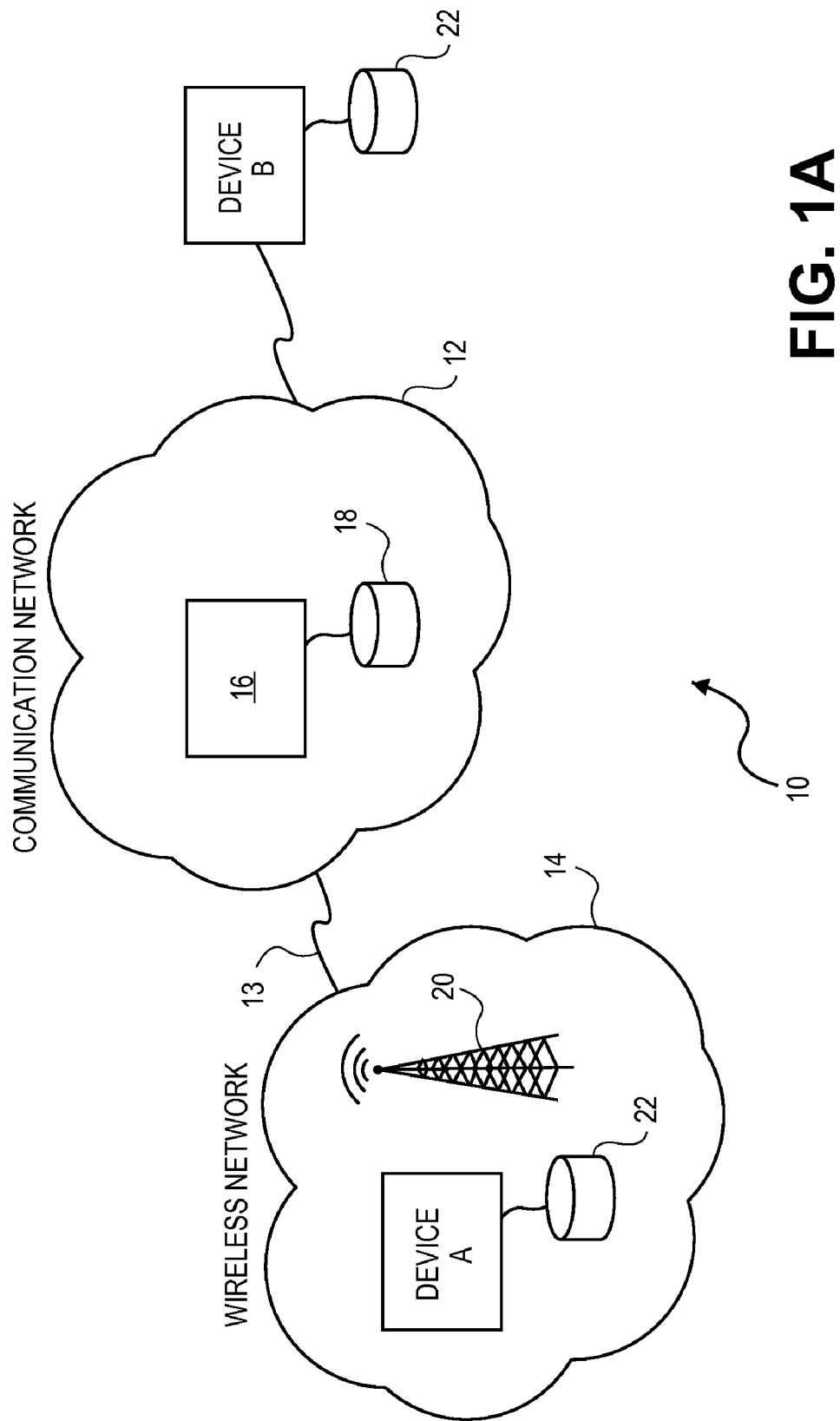
FIG. 1A is a diagram illustrating an exemplary wireless communication system of the present invention.

The invention will now be described in detail with reference to various embodiments thereof as illustrated in the accompanying drawings. In the following description, specific details are set forth in order to provide a thorough understanding of the invention. It will be apparent, however, to one skilled in the art, that the invention may be practiced without using some of the implementation details set forth herein. It should also be understood that well known operations have not been described in detail in order to not unnecessarily obscure the invention.

In U.S. application Ser. No. 12/028,400 filed on Feb. 8, 2008, and U.S. application Ser. No. 12/192,890 filed on Aug. 15, 2008, both entitled "Telecommunication and Multimedia Management Method and Apparatus," an improved voice and other media communication and management system and method is disclosed. The system and method provides one or more of the following features and functions: (i) enabling users to participate in multiple conversation types (MCMS), including live phone calls, conference calls, voice messaging, consecutive (MCMS-C) or simultaneous (MCMS-S) communications; (ii) enabling users to review the messages of conversations in either a live mode or a time-shifted mode (voice messaging); (iii) enabling users to seamlessly transition a conversation between a synchronous "live" near real-time mode and a time shifted mode; (iv) enabling users to participate in conversations without waiting for a connection to be established with another participant or the network. This attribute allows users to begin conversations, participate in conversations, and review previously received time-shifted messages of conversations even when there is no network available, when the network is of poor quality, or other participants are unavailable; (v) enabling the system to save media payload data at the sender and, after network transmission, saving the media payload data at all receivers; (vi) enabling the system to organize messages by threading them sequentially into semantically meaningful conversations in which each message can be identified and tied to a given participant in a given conversation; (vii) enabling users to manage each conversation with a set of user controlled functions, such as reviewing "live", pausing or time shifting the conversation until it is convenient to review, replaying in a variety of modes (e.g., playing faster, catching up to live, jump to the head of the conversation) and methods for managing conversations (archiving, tagging, searching, and retrieving from archives); (viii) enabling the system to manage and share presence data with all conversation participants, including online status, intentions with respect to reviewing any given message in either the live or time-shifted mode, current attention to messages, rendering methods, and network conditions between the sender and receiver; (iix) enabling users to manage multiple conversations at the same time, where either (a) one conversation is current and all others are paused (MCMS); (b) multiple conversations are rendered consecutively (MCMS-C), such as but not limited to tactical communications; or (c) multiple conversations are active and simultaneously rendered (MCMS-S), such as in a stock exchange or trading floor environment; and (ix) enabling users to store all conversations, and if desired, persistently archive them in a tangible medium, providing an asset that can be organized, indexed, searched, transcribed, translated and/or reviewed as needed. For more details on the Telecommunication and Multimedia Management Method and Apparatus, see the above-mentioned U.S. application Ser. Nos. 12/028,400 and 12/192,890, both incorporated by reference herein for all purposes.

The salient feature of the above-described communication system with regard to the graceful degradation of voice communication services is the persistent storage of the voice media of conversations. As noted above with prior art or legacy voice wired and wireless communication systems, no voice transmissions can take place when the usable bit rate on the network connection is insufficient to support live communications. With the persistent storage, however, voice transmissions may occur from storage. Voice transmissions therefore do not have to occur as the voice media is being generated. Instead, at times when the usable bit rate is insufficient for live transmissions, the voice media may be transmitted from persistent storage as network conditions permit. When transmitting from persistent storage, a certain amount of latency may be introduced during the back and forth transmissions of the conversation. The ability to transmit out of persistent storage, however, effectively extends the usability of the network beyond the range and/or capacity where conventional wireless or wired networks would otherwise fail. As a result, communications can still take place, even when usable bit rate conditions on the network are poor or constrained beyond where previously no communication could take place.

Referring to FIG. 1A, a diagram illustrating an exemplary wireless voice communication system of the present invention is shown. The exemplary communication system 10 includes a communication network 12 and a wireless network 14 for enabling voice communication between a wireless device A within the wireless network 14 and a second communication device B connected to the network 12. A gateway connection 13 connects the communication network 12 and the wireless network 14. The communication network 12 may include one or more hops 16 between the wireless network 14 and the second communication device B. Each hop includes a storage element 18 for the persistent storage of media. The communication device A, which is a wireless device, such as either a mobile phone or a radio, connects through a wireless network connection with the wireless network 14 through a radio transceiver 20. The communication devices A and B each include a storage element 22 for the persistent storage of media respectively.

When a conversation takes place between device A and device B, a network connection is made between the two devices through the communication network 12 and the wireless network 14. All voice media of the conversation, regardless if it was transmitted or received, is persistently stored in the storage elements 22 of devices A and B as well as in the storage element 18 of each hop on the network 12 between the two devices. For more details on the persistent storage of the media at each communication device and on the network, see the above-mentioned U.S. application Ser. Nos. 12/028,400 and 12/192,890, both incorporated by reference herein.

Figure 1B:
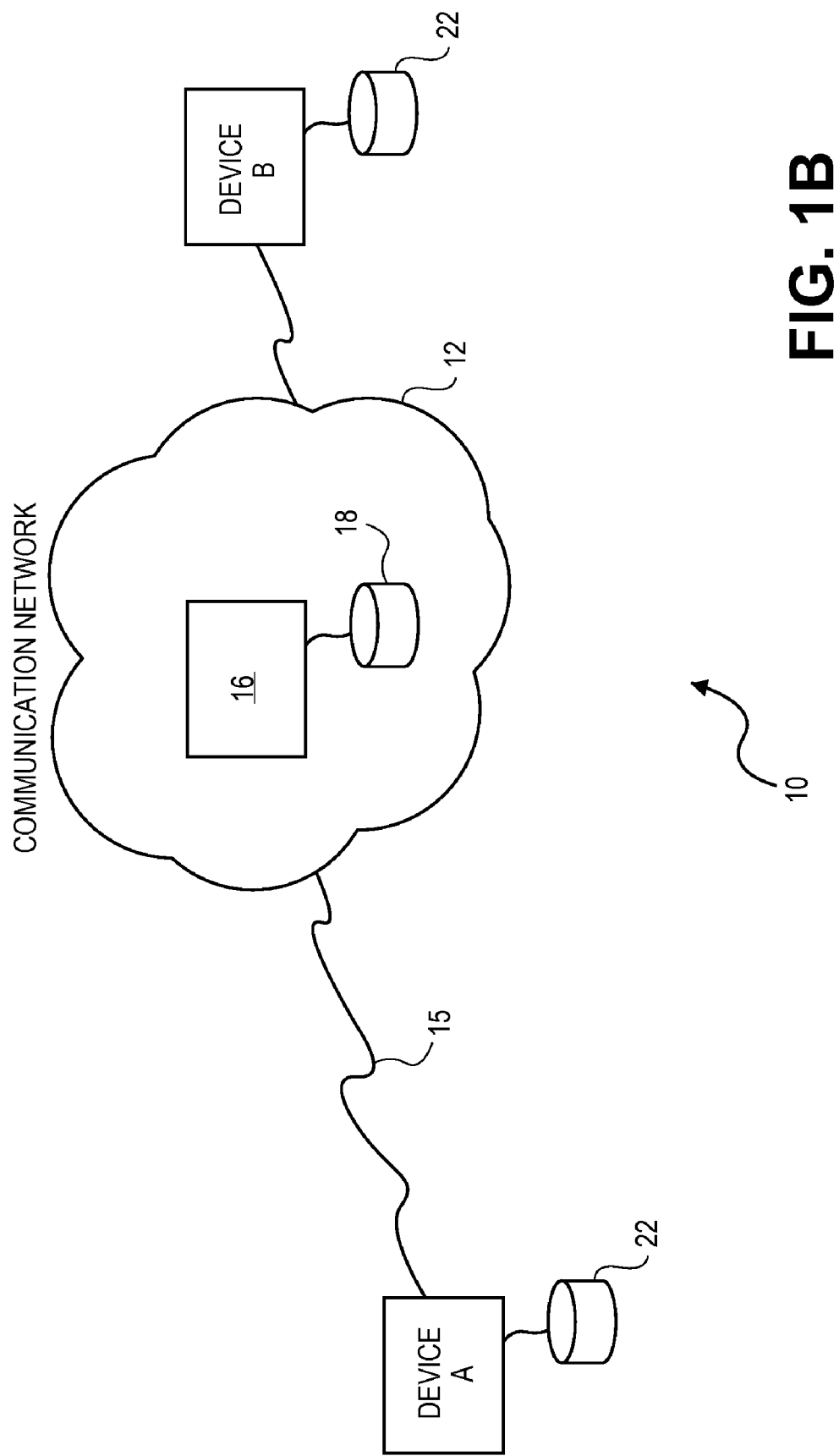
FIG. 1B is a diagram of an exemplary wired communication device of the present invention.

Referring to FIG. 1B, a diagram illustrating another exemplary voice communication system of the present invention is shown. In this embodiment, both devices A and B are connected to communication network 12. In this embodiment, device A is connected to the network 12 through a wired connection 15. When a conversation takes place between device A and device B, a network connection is established between the two devices across network 12. One or more hops 16, each with persistent storage 18, may be required in establishing the network connection between the devices.

It should be noted that the specific network configuration and the communication devices illustrated in FIGS. 1A and 1B are exemplary. In no way, however, should either particular configuration be construed as limiting. In various embodiments, networks 12 and 14 can both be wireless, wired, or any combination thereof. Also, either communication device A or device B can each be either wired or wireless devices. The communication devices A and B can also be two nodes in the same wireless or wired networks or two nodes in different networks. If nodes in different networks, the two networks can communicate directly with one another, or they may communicate through any number gateways or hops in intermediate wired or wireless communication networks. In addition, the capability of each communication device to persistently store voice media of a conversation may vary. For the sake of simplicity, the network connection illustrated in FIGS. 1A and 1B is between just two communication devices. The present invention, however, may be used with voice conversations involving any number of wireless or wired communication devices. In the embodiment illustrated in both FIGS. 1A and 1B, both devices A and B locally and persistently store the media of the conversation. Alternatively, device A may locally and persistently store media, while device B does not. In yet another embodiment, the media for either device A or device B can be persistently stored on a storage device 18 of a hop 16 on the network 12 on behalf either device A or device B respectively. Regardless of the actual configuration, the only requirement for implementing the graceful degradation for device A is at device A and at least one other location, which may be at device B or at any intermediate hop 16 between the two devices.

Figure 3:
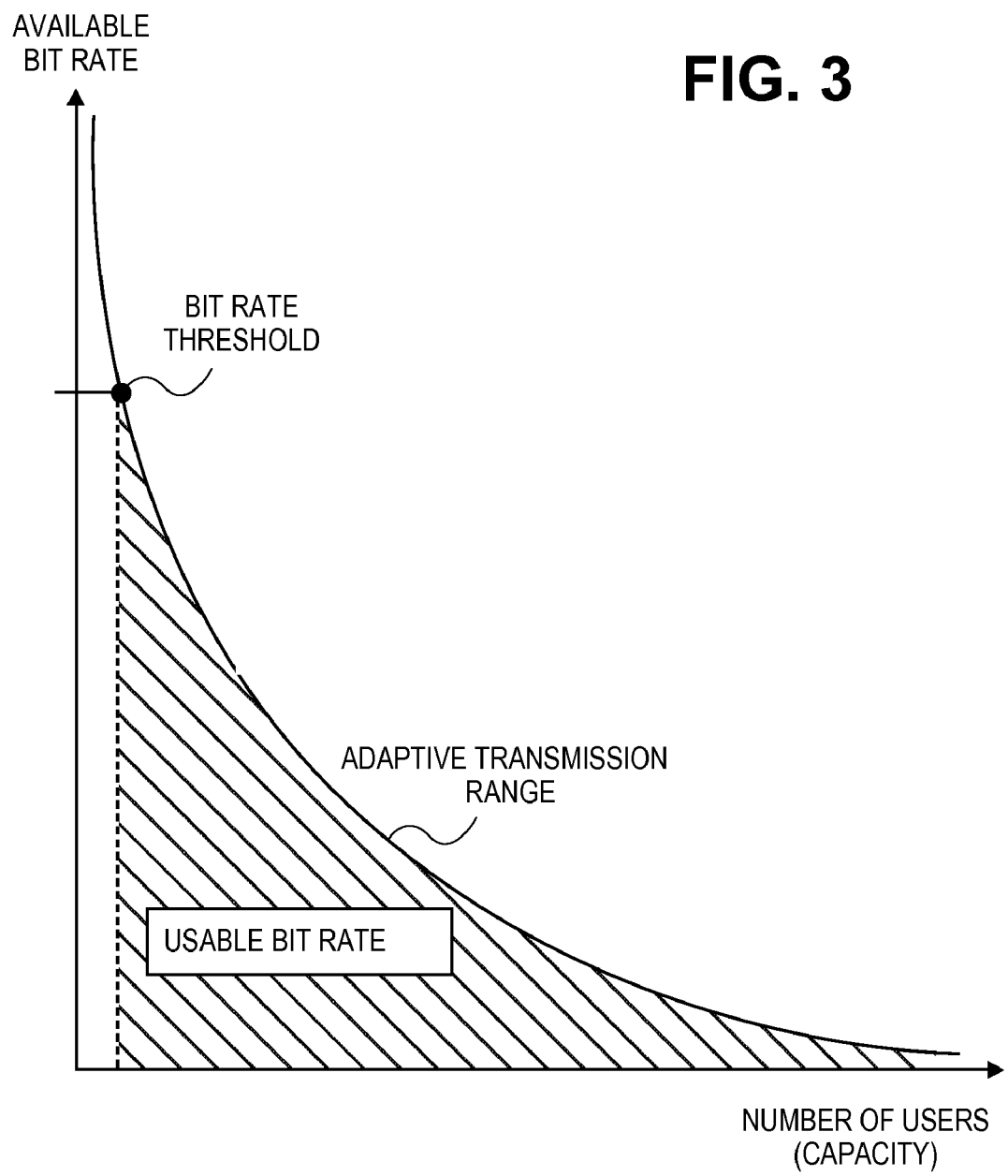
FIG. 3 is a plot illustrating the graceful degradation of network services versus capacity according to the present invention.
Figure 4:
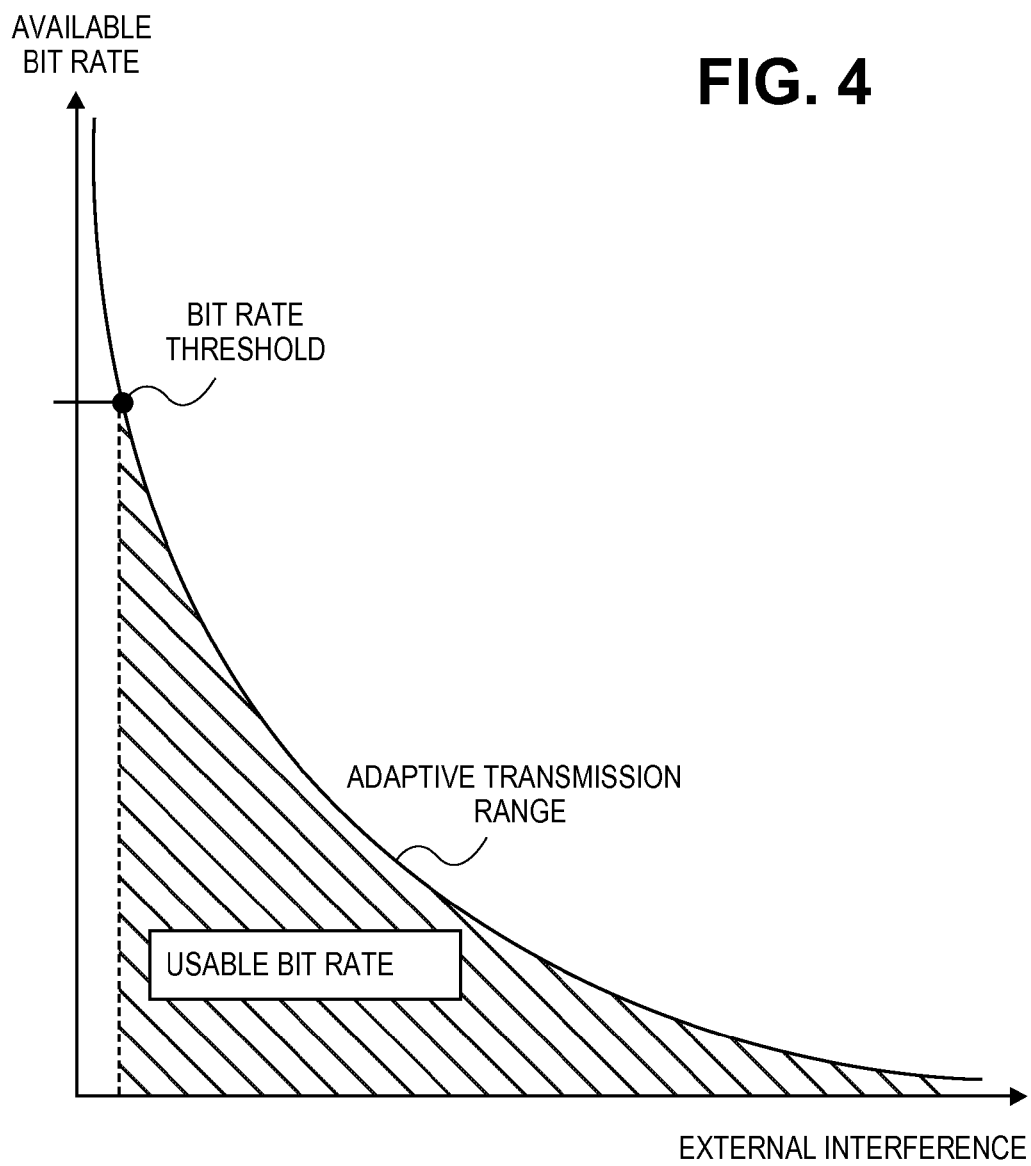
FIG. 4 is a plot illustrating the graceful degradation of network services in the presence of external interference according to the present invention.

FIGS. 2 through 4 illustrate the graceful degradation of services with respect to range, capacity and external interferences that may affect the network respectively. It should be understood that the graceful degradation of services with respect to range is applicable only to wireless networks. The graceful degradation of services with regard to capacity and external interferences, however, equally applies to both wired and wireless networks.

Referring to FIG. 2, a plot illustrating the graceful degradation of wireless services versus range in according to the present invention is illustrated. The diagram plots available usable bit rate on the network on the vertical axis verses the distance the communication device A is from the radio transceiver 20 on the horizontal axis. When the communication device A is relatively close, the available usable bit rate on the network is high. But as the communication device A travels away from the radio transceiver 20, or enters a region of reduced signal strength such as a tunnel or canyon, the usable bit rate on the network connection is reduced, as represented by the downward slope of the usable bit rate curve on the plot.

As the signal strength decreases, the amount of bit rate loss experienced on the network connection will also typically increase. At a certain point, a bit rate threshold is exceeded. Below this point, the bit rate loss typically becomes too large to maintain a live conversation with conventional wireless networks. In other words, the bit rate defines a minimum bit rate throughput sufficient for maintaining near real-time communication.

In one embodiment, the sending device A ascertains when the usable bit rate on the network connection falls below the bit rate threshold by: (i) receiving one or more reports each including a measured transfer rate at which bits transmitted over the network connection safely arrive at a recipient over a predetermined period of time; (ii) computing the usable bit rate on the network connection based on the received one or more reports; and (iii) comparing the computed usable bit rate with the bit rate threshold. The reports are generated by the recipient and sent to device A over the network connection. The receipt reports may include a notation of missing, corrupted or reduced bit rate representations of voice media as well as other network parameters such jitter.

In one embodiment, the bit rate throughput threshold is set at eighty percent (80%) of the bit rate throughput needed to transmit and decode the full bit rate representation of the voice media at the same rate the voice media was originally encoded. It should be noted that this percentage may vary and should not be construed as limiting. The throughput percentage rate may be higher or lower.

The portion of the usable bit rate curve below the bit rate threshold is defined as the adaptive transmission range. When the usable bit rate on the network is in the adaptive transmission range, device A transmits the media from persistent storage. As a result, the usable bit rate below the threshold becomes usable.

The amount of latency associated with transmission below the throughput threshold will vary, typically depending on the range between the communication device A and the radio transceiver 20. If the communication device A is at a range where the bit rate loss is just below the threshold, the amount of latency may be inconsequential. As signal strength decreases, however, latency will typically become progressively greater. As latency increases, the practicality of conducting a voice conversation in the live or real-time mode decreases. Beyond the point where a live voice conversation is no longer practical, voice communication can still take place, but in a time-shifted mode. A user may generate a voice message, which is persistently stored. As usable bit rate conditions on the network permit, transmissions of the media occur from persistent storage. Alternatively, when receiving messages, the voice media may trickle in over the network, also as usable bit rate conditions permit. When the quality or completeness of the received voice media becomes sufficiently good as transmissions are received, they may be retrieved from persistent storage and reviewed or rendered at the receiving communication device. Communication can therefore still take place when signal strength is poor, due to either device A being a relatively far distance from a transceiver 20 or in a location of poor coverage, such as in a tunnel or canyon.

As illustrated in the plot, the available usable bit rate gets progressively smaller as the range from the radio transceiver 20 increases. Eventually the usable bit rate is reduced to nothing, meaning the communication device A is effectively disconnected from the wireless network 14. The persistent storage of media on the communication device A still allows limited communication capabilities even when disconnected from the network. Messages can be generated and stored on communication device A while disconnected from the network. As the device moves within the adaptive transmission range, the usable bit rate range is used for the transmission of the messages. Alternatively, the user of communication device A may review previously received messages while disconnected from the network and receive new messages as usable bit rate on the network permits.

Referring to FIG. 3, a plot illustrating the graceful degradation of wireless services versus the number of users (i.e., capacity) is shown. As illustrated in the Figure, the available usable bit rate per user increases as the number of users or capacity decreases and vice-versa. As capacity increases, the usable bit rate decreases. Eventually, the bit rate threshold is crossed. Below this threshold, all users of the network are forced to operate in the adaptive transmission range when sending and receiving voice messages. In an alternative embodiment, only certain users may be forced into the adaptive transmission range to preserve the usable bit rate of the system for other users who will continue to operate with a usable bit rate above the throughput threshold. The system may decide which users are provided either full or reduced service based on one or more priority schemes, such different levels of subscription services, those first on the network have higher priority than those that have recently joined the network, or any other mechanism to select certain users over other users.

Referring to FIG. 4, a plot illustrating the graceful degradation of services in the presence of an external interference is shown. In this diagram, as the severity of the external interference increases, usable bit rate decreases and vice versa. In situations where the available usable bit rate falls below the bit rate threshold, the user of communication device A may continue communicating in the adaptive transmission range in the same manner as described above. The use of persistent storage of media and the managing of transmissions to meet available usable bit rate therefore increases system robustness and gracefully extends the effective range and capacity of services in situations where external interference would otherwise prevent communication.

Figure 5:
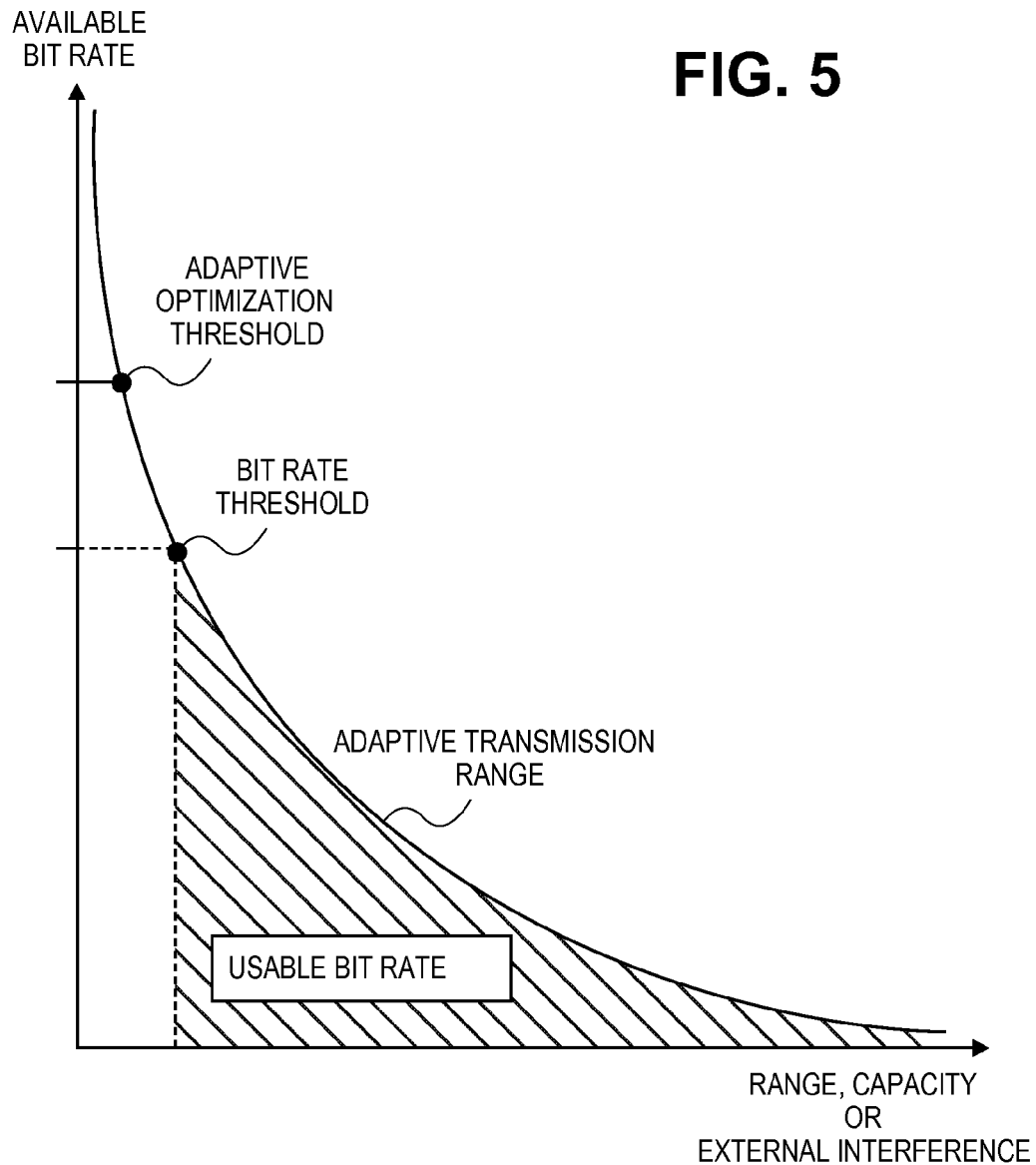
FIG. 5 is a plot illustrating adaptive live optimization for further extending the graceful degradation of services according to another embodiment of the present invention is shown.

Referring to FIG. 5, a plot illustrating adaptive live optimization for further extending the graceful degradation of wired and wireless services according to another embodiment is shown. In the plot, the usable bit rate curve includes an adaptive optimization threshold and the bit rate threshold. In the above-mentioned U.S. application Ser. Nos. 12/028,400 and 12/192,890, adaptive live optimization techniques for maintaining a conversation in the live or real-time mode when usable bit rate on the network falls below the adaptive optimization threshold are described. These adaptive live optimization techniques have the net effect of pushing the bit rate threshold down the usable bit rate curve. In other words, by applying the adaptive live optimization techniques, the amount of available usable bit rate needed on the network for conducting a live conversation is reduced. This is evident in the FIG. 5, which shows the bit rate threshold pushed further down the usable bit rate curve relative to the plots illustrated in FIGS. 2, 3 and 4.

With adaptive live optimization, media is sent from the sending device (e.g., device A) to the receiving device in successive transmission loops. Within each transmission loop, the sending node ascertains if the instantaneous usable bit rate is sufficient to transmit both time-sensitive and the not time sensitive media available for transmission. If there is sufficient usable bit rate on the network, then both types of media are transmitted. The time sensitive media is sent using first packets with a first packetization interval and a first payload size at a rate sufficient for a full bit rate representation of the media to be reviewed upon receipt by the recipient. The non time-sensitive media on the other hand is transmitted using second packets with a second interval set for network efficiency, where the second packet interval is typically larger than the first packetization interval.

The time-sensitivity of the media is determined by either a declared or inferred intent of a recipient to review the media immediately upon receipt. The full bit rate representation of the media is derived from when the media was originally encoded. Typically this means when a person speaks into their phone or radio, the received analog media is encoded and digitized. This encoded media is referred to herein as the full bit rate representation of the media. The sending node ascertains usable bit rate on the network based on receipt reports from the receiving node. The receipt reports include measured network parameters, such the corrupted or missing packets (i.e., media loss) as well as possibly other parameters, including jitter for example.

If the usable bit rate is inadequate for transmitting both types of available media, then the sending node ascertains if there is enough usable bit rate on the network connection for transmitting just the time-sensitive media. If so, the time-sensitive media is transmitted at the first packetization interval and first payload size and at the rate sufficient for the full bit rate representation to be reviewed upon receipt. The transmission of the not time-sensitive media is deferred until usable bit rate in excess of what is needed for time-sensitive transmissions becomes available.

If the usable bit rate on the network connection is not sufficient for sending just the time-sensitive media, then several techniques to reduce the number of bits used to represent the time-sensitive media is applied. In a first technique, the number of bits included in the first payloads is reduced and the reduced payload sized packets are then transmitted at the first packetization interval. In other words, the number of bits used to represent each unit of time (i.e., time-slice) of voice media is reduced relative to the full bit rate representation of the voice media. The reduction of the bits per payload may be accomplished by adjusting codec settings, using different codecs, applying a compression algorithm, or any combination thereof.

If there still is not sufficient bandwidth, then the packetization interval used to transmit the packets with the reduced bit payloads is progressively increased. By increasing the packetization interval, latency is introduced. Eventually, if the packetization interval is increased too much, then it becomes impractical to maintain the conversation in the live or real-time mode.

Lastly, the adaptive live optimization controls the rate of transmitted and received voice transmissions to meet the usable available bit rate on the network connection. As bit rate becomes available, available voice media is either sent or received at a rate determined by usable bit rate conditions on the network. Consequently, communication can still take place. The adaptive live optimization therefore enables conversations to continue when network conditions would otherwise prevent live communications.

Figure 6:
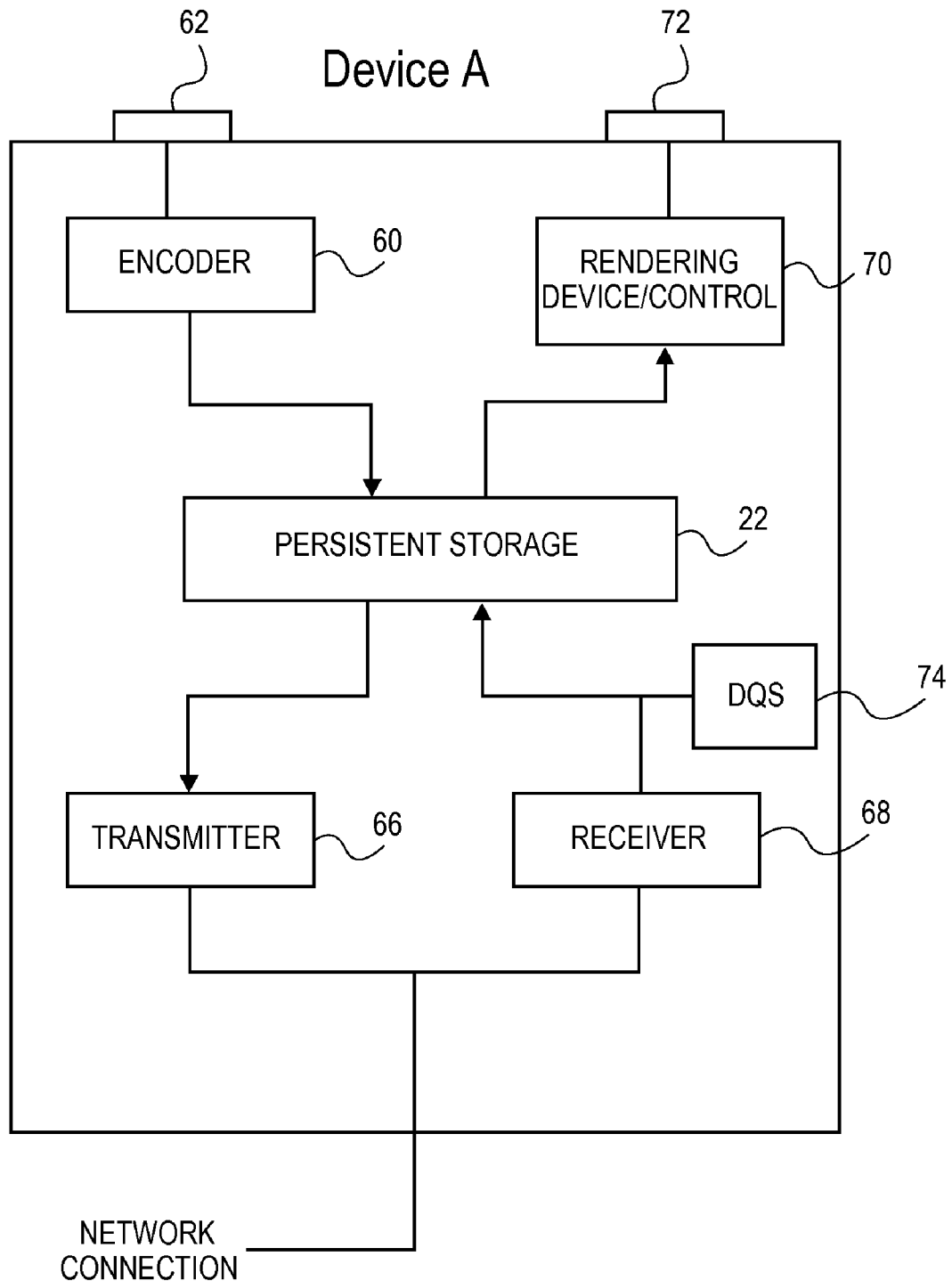
FIG. 6 is a diagram of a communication device with persistent storage in accordance with the present invention.

Referring to FIG. 6, a diagram of device A is illustrated. The device A includes an encoder 60 configured to receive analog voice signals from a microphone 62, the persistent storage device 22, a transmitter 66, a receiver 68, a rendering/control device 70 and a speaker 72. During voice communications, the user of device A will periodically generate voice media by speaking into the microphone 62. The encoder 60 encodes or digitizes the voice media, generating a full bit rate representation of the voice media, which is persistently stored in device 22. The transmitter 66 is responsible for (i) receiving receipt reports from a recipient, (ii) calculating the usable bit rate on the network connection, (iii) ascertaining if the usable bit rate exceeds or is below the bit rate threshold sufficient for live communication, and (iv) either (a) transmits the full bit rate representation of the voice media when the threshold is exceeded or (b) generates and transmits only time-sensitive and/or a reduced bit rate version of the voice media, commensurate with the usable bit rate, when the usable bit rate is less than the threshold. Alternatively, the receiver 68 stores the voice media received over the network connection in persistent storage device 64. When the received media is of sufficient completeness, it may be retrieved from persistent storage by rendering/control device 70 and played through speaker 72 for listening or review by the user. The review of media may occur in either a near real-time mode or in a time-shifted mode. When in the time-shifted mode, the media is retrieved from the persistent storage device 22 and rendered. For more details on the operation of device A, see the above-mentioned U.S. application Ser. Nos. 12/028,400 and 12/192,890.

A data quality store (DQS) and manager 74 is coupled between the receiver 68 and the persistent storage device 22. The data quality store and manager 74 is responsible for noting any missing, corrupted or reduced bit rate versions of the voice media received over the network connection in the data quality store. The DQS and manager 74 are also responsible for transmitting requests for retransmission of any voice media (or other types of received media) noted in the data quality store. When the requested media is received after the request for retransmission is satisfied, the notation corresponding to the media is removed from the DQS. This process is repeated until a complete copy of the media is received and persistently stored, wherein the complete copy is a full bit rate representation of the media as originally encoded by the originating device. In this manner, both the sending and receiving communication devices are able to maintain synchronous copies of the voice (and other types) of media of a conversation.

In one embodiment of device A, the transmitter 66 may transmit voice or other media directly from encoder 60 in parallel with the persistent storage in device 22 when the user of the device A is communicating in the real-time mode. Alternatively, the media can first be written in persistent storage 22 and then transmitted from storage. With the latter embodiment, any delay associated with the storage occurs so fast that it is typically imperceptible to users and does not interfere or impede with the real-time communication experience of the user. Similarly, received media can be rendered by device 70 in parallel with persistent storage or serially after persistent storage when in the real-time mode.

The aforementioned description is described in relation to a wired or wireless communication devices. It should be understood that the same techniques and principles of the present invention also apply to the hops between a sending and a receiving pair in either a wireless or wired voice network. In the case of a hop 16, voice media is typically not generated on these devices. Rather these devices receive voice media from another source, such as a phone, radio or another hop on the network, and are responsible for optionally persistently storing the received voice media and forwarding the voice media on to the next hop or the recipient as described above.

It should also be understood that the present invention may be applied to any voice communication system, including mobile or cellular phone networks, police, fire, military taxi, and first responder type communication systems, legacy circuit-based networks, VoIP networks, the Internet, or any combination thereof.

Device A may be one of the following: land-line phone, wireless phone, cellular phone, satellite phone, computer, radio, server, satellite radio, tactical radio or tactical phone The types of media besides voice that may be generated on device A and transmitted may further include video, text, sensor data, position or GPS information, radio signals, or a combination thereof.

The present invention provides a number of advantages. The range of wireless voice networks is effectively extended as communication may continue beyond the throughput threshold. In addition, the present invention may increase the number of effective users or capacity that may use either a wireless or wired voice communication system. Rather than dropping users when system usable bit rate is overwhelmed, the present invention may lower the usable bit rate below the throughput threshold for some or all users until usable bit rate conditions improve. Lastly, the present invention increases the robustness of a both wireless and wired communication system in dealing with external interferences.

Although many of the components and processes are described above in the singular for convenience, it will be appreciated by one of skill in the art that multiple components and repeated processes can also be used to practice the techniques of the system and method described herein. Further, while the invention has been particularly shown and described with reference to specific embodiments thereof, it will be understood by those skilled in the art that changes in the form and details of the disclosed embodiments may be made without departing from the spirit or scope of the invention. For example, embodiments of the invention may be employed with a variety of components and should not be restricted to the ones mentioned above. It is therefore intended that the invention be interpreted to include all variations and equivalents that fall within the true spirit and scope of the invention.

What is claimed is:

1. A communication device, comprising:
    a receiver configured to receive voice media generated while using the communication device, the communication device configured to be connected to a network;
    an encoder configured to encode the voice media to generate a full bit rate representation of the media generated while using the communication device;
    a storage device configured to store the full bit rate representation of the voice media generated while using the communication device and to store voice media received over the network connection;

a transmitter configured to ascertain if the usable bit rate on the network falls below a bit rate threshold, the bit rate threshold defining a minimum bit rate throughput sufficient for maintaining near real-time communication, the transmitter further configured to transmit the voice media generated using the communication device from the storage device when the ascertained usable bit rate is below the bit rate threshold, the voice media being transmitted by the transmitter at a bit rate below the bit rate threshold, thereby effectively extending the usable range and/or capacity of the network for voice communication when the ascertained usable bit rate falls below the bit rate threshold; and a rendering device configured to render the voice media stored in the storage device, the rendering device configured to provide the ability to render the voice media received over the network when the voice media received over the network is of sufficient completeness that it will be decipherable when rendered.

2. The communication device of claim 1, wherein the transmitter is further configured to ascertain if the usable bit rate on the network falls below the bit rate threshold by:

receiving one or more reports each including a measured transfer rate at which bits transmitted over the network connection safely arrive at a recipient over a predetermined period of time;

computing the usable bit rate on the network based on the received one or more reports; and comparing the computed usable bit rate with the bit rate threshold.

3. The communication device of claim 1, wherein the minimum bit rate throughput sufficient for maintaining near real-time communication is at least 80% of the bit rate throughput needed to transmit and decode the full bit rate representation of the voice media at the same rate the voice media was originally encoded.

4. The communication device of claim 1, wherein the transmitter is further configured to:

ascertain when the usable bit rate on the network exceeds the bit rate threshold; and transmit the full bit rate representation of the voice media generated using the communication device when the ascertained usable bit rate exceeds the bit rate threshold.

5. The communication device of claim 4, wherein the transmitter transmits the full bit rate representation of the voice media by:

(i) defining a transmission loop;

(ii) ascertaining the voice media generated using the communication device available for transmission in the defined transmission loop; and (iii) transmitting the full bit rate representation of the available voice media generated using the communication device during the transmission loop.

6. The communication device of claim 5, wherein the transmitter is further configured to define successive transmission loops and repeat (i) through (iii) for each transmission loop.

7. The communication device of claim 1, wherein the transmitter transmits the voice media generated while using the communication device from storage by varying the amount of latency during the transmission as needed so that the transmission bit rate substantially meets the usable bit rate on the network when the ascertained usable bit rate falls below the bit rate threshold.

8. The communication device of claim 1, wherein the transmitter transmits the voice media generated using the communication device from storage by:

defining a transmission loop;

determining if the ascertained usable bit rate is not sufficient to transmit the available voice media in the defined transmission loop;

ascertaining time-sensitive voice media among all the available media ready for transmission, the time-sensitivity of the voice media being determined by an intent of a recipient to review the voice media upon receipt; and transmitting only the available time-sensitive voice media if the ascertained usable bit rate is sufficient to transmit only the available time-sensitive voice media.

9. The communication device of claim 8, wherein the transmitter transmits the voice media generated using the communication device from storage further by:

determining if the ascertained usable bit rate is not sufficient to transmit only the available time-sensitive voice media;

generating a reduced bit rate representation of the available time-sensitive voice media; and transmitting the reduced bit rate representation of the available time-sensitive voice media.

10. The communication device of claim 9, wherein the transmitter is further configured to generate the reduced bit rate representation by using fewer bits per unit of time when packetizing the available time-sensitive voice media.

11. The communication device of claim 9, wherein the transmitter is further configured to generate the reduced bit rate representation when packetizing the media for transmission by using (a) one or more different codec settings, (b) one or more different codecs, (c) a compression algorithm; or (d) any combination of (a) through (c).

12. The communication device of claim 9, wherein the transmitter is further configured to generate the reduced bit rate representation by increasing the packetization interval used to transmit the available time-sensitive voice media.

13. The communication device of claim 9, wherein the transmitter is further configured to generate the reduced bit rate representation by adjusting the transmission rate at which packets containing the available time-sensitive voice media are transmitted.

14. The communication device of claim 9, wherein the transmitter is further configured to generate the reduced bit rate representation by performing one or more of the following:

(i) using fewer bits per unit of time when packetizing the reduced bit rate representation of the available time-sensitive voice media relative to the full bit rate representation;

(ii) increasing the packetization interval when transmitting the available time-sensitive voice media;

(iii) adjusting the rate at which packets containing the available time-sensitive voice media are transmitted; or (iv) any combination of (i) through (iii).

15. The communication device of claim 8, wherein the transmitter is further configured to:

define successive transmission loops; and perform the functions provided in any one of claims 8, 9 and 14 as needed for each of the successive transmission loops.

16. The communication device of claim 1, further comprising a data quality store configured to note any missing, corrupted or reduced bit rate representations of the voice media received over the network connection and a data store management element configured to transmit from the communication device over the network connection requests for retransmission of any voice media noted in the data quality store.

17. The communication device of claim 16, wherein the data store management element is further configured to remove the notation from the data quality store as the requests for retransmission are satisfied.

18. The communication device of claim 1, wherein the storage device and the transmitter cooperate to effectively extend the usable range of the network when the ascertained usable bit rate falls below the bit rate threshold to just above the point before the usable bit rate on the network is substantially reduced to nothing.

19. The communication device of claim 1, wherein the storage device and the transmitter further cooperate to:
    ascertain when the usable bit rate on the network is substantially reduced to nothing;
    store voice media generated using the communication device when the usable bit rate on the network is substantially reduced to nothing;
    delay the transmission of the voice media generated using the communication device when the usable bit rate on the network is substantially reduced to nothing; and
    transmit the voice media from storage after the delay as the usable bit rate on the network increases.

20. The communication device of claim 1, further comprising a conversation management element configured to define a conversation and to ascertain the voice media generated using the communication device and the voice media received over the network associated with the conversation.

21. The communication device of claim 1, wherein the storage device is further configured to store the voice media generated using the communication device and the voice media received over the network in a time-based format.

22. The communication device of claim 1, further comprising a rendering control element configured to provide the ability to render the voice media stored in the storage device in a time-shifted mode by retrieving the media from the storage device and rendering the retrieved media on the communication device.

23. The communication device of claim 1, further comprising a rendering control element configured to provide the ability to render the voice media received over the network as it is received over the network in a near real-time mode.

24. The communication device of claim 1, wherein the storage device is further configured to store a full bit rate representation of the voice media received over the network at the communication device.

25. The communication device of claim 1, wherein the network is a wireless network and the transmitter transmits the voice media generated using the communication device from the storage device at the bit rate below the bit rate threshold, thereby effectively extending the usable range and/or capacity of the wireless network.

26. The communication device of claim 1, wherein the network is a wired network and the transmitter transmits the voice media generated using the communication device from storage at the bit rate below the bit rate threshold to effectively extends the usable capacity of the wired network.

27. The communication device of claim 1, wherein the communication device comprises one of the following: landline phone, wireless phone, cellular phone, satellite phone, computer, radio, server, satellite radio, tactical radio or tactical phone.

28. The communication device claim 1, wherein the transmitter is further configured to transmit, in addition to the voice media, one or more of the following types of media: video, text, sensor data, position or GPS information, radio signals, or a combination thereof.

* * * * *